3,439,004
PREPARATION OF TRIARYL METHANE DYES
Maurice E. Beckett, Homewood, Ill., assignor to The Sherwin-Williams Company, Cleveland, Ohio, a corporation of Ohio
No Drawing. Filed Apr. 26, 1965, Ser. No. 451,023
Int. Cl. C09b *11/20, 11/22*
U.S. Cl. 260—391                                    5 Claims

ABSTRACT OF THE DISCLOSURE

Mono-, di- and tri(cyclohexylamine)triaryl methane carbinols, mixtures thereof, salts thereof, and mixtures of said salts are prepared in which the aryl groups are phenyl or tolyl and the amine groups are primary or secondary, depending upon the number of cyclohexyl radicals substituted. The process involves reacting a triaminotriaryl methane carbinol with cyclohexylamine in the presence of an acid catalyst, distilling off any excess cyclohexylamine and recovering the resultant dye product. This product is very water insoluble, makes an excellent pigment, and is especially useful in duplicating inks and moisture set varnishes.

---

This invention relates to triaryl methane dyes, their preparation and use, and more particularly to new and improved triaryl methane dyes, their preparation and use as pigments, in duplicating inks, and in moisture-set varnishes.

The preparation of triaryl methane dyes is well known. Thus, it is possible to prepare what is commonly referred to as a parafuchsine base by reacting together aniline, formaldehyde, and hydrochloric acid in the presence of a suitable catalyst to form a triaminotriphenyl methane carbinol in which the primary amino groups are attached to the phenyl groups in the para position. In the crude product, the triaminotriphenyl methane carbinol is present as a solution in an excess of aniline. This product can be reacted with aniline using an organic acid, such as acetic acid or benzoic acid as a catalyst, the resultant reaction sometimes being called "phenylation." One, two or three moles of aniline (or mixtures) can be added to the parafuchsine molecule, depending on the temperature, time, amount of catalyst and, to some degree, the concentration. One mole of ammonia is given off for each mole of aniline reacted.

In the past, many primary amines have been reacted in this manner with parafuchsine and its homologues. These have included para-aminodiphenylamine, various substituted anilines, naphthylamines, biphenylamines, and diaminodiphenyl methane. Only the reaction with aniline to form the dye known as Spirit Blue and/or Opal Blue has survived commercially.

One of the objects of the present invention is to provide a new and improved dye of the triaryl methan series which is a water insoluble basic dye which can be employed as a pigment and can also be dissolved in alcoholic vehicles to produce duplicating inks and moisture-set varnishes in violet shades, including violet shades of red and violet shades of blue.

A further object of the invention is to produce new and improved dyes of the type described which have better solubility in ethyl alcohol than Spirit Blue or Opal Blue.

Another object of the invention is to provide a new and improved process for producing dyes of the type described. Other objects will appear hereinafter.

In accordance with the invention it has been found that new and improved dyes can be prepared which can be described as mono-, di, and tri(cyclohexylamine)triaryl methane carbinols, mixtures thereof, salts thereof, and mixtures of said salts. These dyes are preferably prepared by reacting a triaminotriaryl methane carbinol with cyclohexylamine in sufficient proportions to replace one, two or three of the amino groups with a cyclohexylamino group. This reaction is preferably carried out in the presence of about 1% to 10% by weight of a lower molecular weight monocarboxylic acid such as, for example, acetic acid or benzoic acid. Benzoic acid is preferred.

The temperature used is subject to variation but is preferably the reflux temperature. Good results have been obtained by carrying out the process at temperatures within the range of 125° C. to 135° C. in the presence of benzoic acid as the catalyst. Any excess cyclohexylamine is preferably distilled off after the desired reaction has been completed.

The resultant product can be described as a mono-, di- or tri(cyclohexylamino)triaryl methane carbinol or a mixture of such carbinols. This product in itself is a water insoluble basic dye which forms reddish purple moisture-set inks of great brilliance when dissolved in moisture-set varnishes.

The carbinol can be further reacted with an acid in order to form a salt. When this is done, the resultant products are salts of mono-, di- and tri(cyclohexylamino) triaryl methane and mixtures of such salts. A preferred salt is made by reacting the carbinol with acetic acid. Other salts can be prepared by using other acids, such as, hydrochloric acid, propionic acid, benzoic acid, and the like. Thus, the acetate salts of a mixture of mono-, di- and tri(cyclohexylamino)triphenyl methanes are water insoluble basic dyes having considerably better solubility in ethyl alcohol than the acetate salts of normal Spirit Blue. They are, therefore, particularly useful in duplicating inks made with glycol solvents. Excellent violet shades are obtained.

The specific chemical structure of the new dyes will vary somewhat depending upon the nature of the triaminotriaryl methane base. Thus, where the aryl groups are unsubstituted and aniline was originally used in making the triaminotriaryl methane base, the aryl groups in the final products would be phenyl groups. On the other hand, if a toluidine is used in making the base, the phenyl nuclei will be substituted by a methyl group, or if mixtures of aniline and toluidine are employed, some phenyl nuclei will be unsubstituted and others will be substituted by a methyl group.

In general, the preferred dyes prepared in accordance with the invention have the following formulae:

Formula I

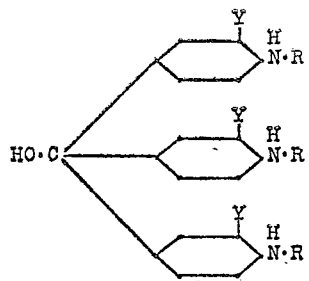

Formula II

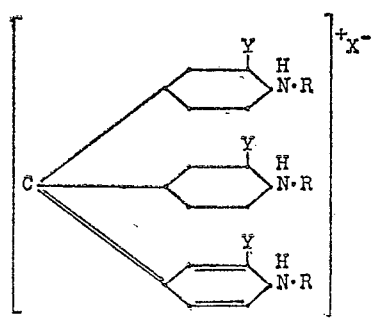

wherein Y is from the group consisting of hydrogen and methyl, R is from the group consisting of hydrogen and cyclohexyl and at least one R is cyclohexyl, and X is a salt forming anion.

The preferred products are those in which Y is hydrogen. The preferred salts are those in which X is an acetate radical. It will be recognized that the compounds of Formula I are carbinols and the compounds of Formula II are salts.

The best mode contemplated for the practice of the invention is illustrated by the following examples in which the quantities are given by weight unless otherwise indicated.

EXAMPLE I 1600 parts of parafuchsine base liquor prepared by reacting aniline with formaldehyde, hydrochloric acid and a suitable catalyst and containing approximately 15% parafuchsine in aniline solution was distilled under vacuum to remove the excess aniline. 1250 parts of cyclohexylamine was then added and the solution heated to 100° C. Thereafter 20 parts of benzoic acid was added and the solution was heated to the reflux temperature (125° C.–135° C.) and refluxed strongly for 4 hours. Excess cyclohexylamine was distilled off. The melt was poured out and allowed to cool. The resultant product had a crude weight of about 550 parts.

The cooled melt was broken up and ground. It was then dissolved in three times its weight of glacial acetic acid at a temperature below 50° C. The resultant solution was poured slowly into 5000 parts of water containing 500 parts of sodium chloride. The color slurry was filtered and well washed with water. In this case the sodium chloride assists in salting out the dye. The filter cake was dried and ground. The yield was about 400 to 420 parts.

In this example, the dye obtained before the addition of the glacial acetic acid corresponds to Formula I where Y is hydrogen. The dye obtained after the addition of the acetic acid corresponds to Formula II where Y is hydrogen and X is the acetate radical. This latter dye can also be represented by the formula:

Formula III

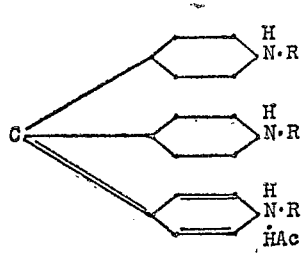

where R is cyclohexyl and HAc represents the acetate radical. These dyes are mixtures of reaction isomers. It is theoretically possible to have either the mono-, di- or tricyclohexyl derivative but in practice all of them are believed to be present with the monocyclohexyl derivative in minor proportion. All have violet shades.

As previously indicated, the acetic acid salt prepared as described in this example is a water insoluble basic dye which has considerably better solubility in ethyl alcohol than the acetic acid salt of normal Spirit Blue. It is particularly useful in the preparation of duplicating inks which are normally made from glycols, such as, for example, diethylene glycol or triethylene glycol. Being water insoluble, it can also be used as a pigment in aqueous vehicles.

EXAMPLE II

The carbinol form of the dye corresponding to Formula I prepared as described in Example I is finely ground and is added to a 50% solution of a fumaric acid rosin adduct in diethylene glycol in proportions to give a composition containing 20 parts of said dye and 80 parts of said solution, thereby producing a moisture-set varnish having a brilliant violet red color. Varnishes of this type are especially useful when employed as printing inks on cartons and other materials where inexpensive printing is desired. These varnishes are usually referred to as moisture-set varnishes, steam-set varnishes or vapor-set varnishes. Usually they contain diethylene glycol and/or triethylene glycol and an acidic resin, for example, a carboxylic acid resin which is capable reacting with a dye of the type herein described so that when the composition is employed as a printing composition and the printed product is passed through a steam bath, the reaction product of the dye and the resin remains printed on the material to which it has been applied and the glycol is dissolved. The proportions of the dye of the present invention which can be employed in the preparation of such compositions are subject to variation but the quantities used are preferably within the range of 10% to 30% by weight of the printing composition.

It will be understood that the invention is not limited to any particular method in the preparation of the initial parafuchsine (or pararosaniline) base employed as a starting material in the preparation of these dyes. Nor is the invention limited to a particular catalyst or to a particular amount of catalyst in carrying out the reaction between the initial triaminotriaryl methane base and cyclohexylamine. The time required to carry out this reaction is subject to variation depending upon the type of acid catalyst used. For example, when the parafuchsine base is reacted with cyclohexylamine using acetic acid as the catalyst, it is preferable to reflux the reaction mixture for ten hours in order to effect maximum reaction and to isolate the colored product as the hydrochloride. When benzoic is used as described in Example I, the desired result can be obtained in a shorter time. The hydrochloride of the dye of Formula II where Y is hydrogen has a brilliant red violet shade, is insoluble in water and quite soluble in ethyl alcohol. This dye in its hydrochloride form could not be sulfonated by ordinary means, such as, reaction with concentrated sulfuric acid. However, the dye corresponding to Formula I was sulfonated by using oleum.

The invention provides a new class of triaryl methane dyes which are especially useful in various applications, particularly as pigments in aqueous vehicles and as dissolved dyes in alcoholic vehicles, including duplicating inks and moisture-set varnishes.

The invention is hereby claimed as follows:

1. A process for preparing triaryl methane dyes which comprises reacting a triamino triarylmethane carbinol in which the aryl groups are from the class consisting of phenyl and tolyl and the amine groups are $NH_2$ groups with cyclohexylamine in the presence of an organic carboxylic acid catalyst for said reaction, distilling off any excess cyclohexylamine and recovering the resultant triaryl methane dye product.

2. A process as claimed in claim 1 in which said triaminotriaryl methane carbinol is a parafuchsine base.

3. A process as claimed in claim 1 in which said acid catalyst is benzoic acid.

4. A process as claimed in claim 1 in which the reaction product is reduced to a state of subdivision and further reacted with an acid in order to form a salt of said reaction product.

5. A process as claimed in claim 4 in which the acid employed in said further reaction is glacial acetic acid.

References Cited

UNITED STATES PATENTS

| | | | |
|---|---|---|---|
| 2,978,352 | 4/1961 | Clarke | 260—388 |
| 3,320,288 | 5/1967 | Bettag et al. | 260—388 |

FOREIGN PATENTS

| | | |
|---|---|---|
| 1,057,146 | 5/1959 | Germany. |

OTHER REFERENCES

Houben-Weyl, Methoden der Organische Chemie, vol. 11/1, pp. 250–256 (4th ed. 1957).

LORRAINE A. WEINBERGER, *Primary Examiner.*

HAROLD C. WEGNER, *Assistant Examiner.*

U.S. Cl. X.R.

106—22; 260—40